(12) United States Patent
Fu et al.

(10) Patent No.: US 11,978,011 B2
(45) Date of Patent: May 7, 2024

(54) METHOD AND APPARATUS FOR OBJECT STATUS DETECTION

(71) Applicant: Symbol Technologies, LLC, Holtsville, NY (US)

(72) Inventors: Bo Fu, Wheeling, IL (US); Yan Zhang, Buffalo Grove, IL (US); Yan-Ming Cheng, Inverness, IL (US); Jordan K. Varley, Mississauga (CA); Robert E. Beach, Los Altos, CA (US); Iaacov Coby Segall, Toronto (CA); Richard Jeffrey Rzeszutek, Toronto (CA); Michael Ramputi, Ronkonkoma, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 700 days.

(21) Appl. No.: 16/610,041

(22) PCT Filed: May 1, 2018

(86) PCT No.: PCT/US2018/030363
§ 371 (c)(1),
(2) Date: Oct. 31, 2019

(87) PCT Pub. No.: WO2018/204308
PCT Pub. Date: Nov. 8, 2018

(65) Prior Publication Data
US 2020/0118063 A1    Apr. 16, 2020

Related U.S. Application Data

(60) Provisional application No. 62/492,695, filed on May 1, 2017.

(51) Int. Cl.
*G06Q 10/087* (2023.01)
*G06Q 20/20* (2012.01)
(Continued)

(52) U.S. Cl.
CPC ......... *G06Q 10/087* (2013.01); *G06Q 20/203* (2013.01); *G06T 7/55* (2017.01);
(Continued)

(58) Field of Classification Search
CPC ...... G06Q 10/087; G06Q 20/203; G06T 7/55; G06T 7/74; G06V 10/10; G06V 10/16; G06V 20/36; G06V 20/63; G06F 15/76
See application file for complete search history.

(56) References Cited

U.S. PATENT DOCUMENTS 5,209,712 A    5/1993    Ferri
5,214,615 A    5/1993    Bauer
(Continued)

FOREIGN PATENT DOCUMENTS

CA    2835830    11/2012
CA    3028156    1/2018
(Continued)

OTHER PUBLICATIONS

International Search Report and Written Opinion for International Application No. PCT/US2018/030363 dated Jul. 9, 2018.
(Continued)

*Primary Examiner* — Peter Ludwig
*Assistant Examiner* — Avia Salman

(57) ABSTRACT

A method of object status detection for objects supported by a shelf, from shelf image data, includes: obtaining a plurality of images of a shelf, each image including an indication of a gap on the shelf between the objects; registering the images to a common frame of reference; identifying a subset of the gaps having overlapping locations in the common frame of reference; generating a consolidated gap indication from the subset; obtaining reference data including (i) identifiers for the objects and (ii) prescribed locations for the objects within the common frame of reference; based on a
(Continued)

comparison of the consolidated gap indication with the reference data, selecting a target object identifier from the reference data; and generating and presenting a status notification for the target product identifier.

9 Claims, 10 Drawing Sheets

(51) Int. Cl.
*G06T 7/55* (2017.01)
*G06T 7/73* (2017.01)
*G06V 20/00* (2022.01)
*G06V 20/62* (2022.01)

(52) U.S. Cl.
CPC ............... *G06T 7/74* (2017.01); *G06V 20/36* (2022.01); *G06V 20/63* (2022.01)

(56) References Cited

U.S. PATENT DOCUMENTS

| | | | |
|---|---|---|---|
| 5,408,322 A | 4/1995 | Hsu et al. |
| 5,414,268 A | 5/1995 | McGee |
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,623,733 B2 * | 11/2009 | Hirosawa ............... H04N 5/272 348/222.1 |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,547,838 B2 | 1/2017 | Larsen |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |

(56) References Cited

U.S. PATENT DOCUMENTS

| | | |
|---|---|---|
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,429,487 B1 | 10/2019 | Fowe |
| 11,003,188 B2 | 5/2021 | Scott et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0078224 A1 | 4/2006 | Hirosawa |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1* | 3/2009 | Opalach .............. G06K 9/00 358/1.15 |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |

(56) References Cited

U.S. PATENT DOCUMENTS

| | | |
|---|---|---|
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0088761 A1 | 3/2014 | Shamlian et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0016712 A1* | 1/2015 | Rhoads ............... G06V 10/751 707/769 |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1 | 10/2015 | Dessouky et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2016/0375592 A1 | 12/2016 | Szatmary et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1* | 2/2017 | Rizzolo ............... G06V 20/10 |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1* | 6/2017 | Schwartz ............... G06V 10/44 |
| 2017/0178227 A1 | 6/2017 | Gornish |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2017/0344016 A1 | 11/2017 | Chen et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |

(56) References Cited

U.S. PATENT DOCUMENTS

| | | |
|---|---|---|
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0107999 A1 | 4/2018 | Rizzolo et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyavskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034854 A1 | 1/2019 | Borodow et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0160675 A1 | 5/2019 | Paschal, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0359300 A1 | 11/2019 | Johnson et al. |
| 2019/0392212 A1 | 12/2019 | Sawhney et al. |
| 2019/0392506 A1 | 12/2019 | Bogolea et al. |
| 2020/0049511 A1 | 2/2020 | Sithiravel et al. |
| 2020/0053325 A1 | 2/2020 | Deyle et al. |
| 2020/0064483 A1 | 2/2020 | Li et al. |
| 2020/0068126 A1 | 2/2020 | Fink et al. |
| 2020/0111267 A1 | 4/2020 | Stauber et al. |
| 2020/0118064 A1 | 4/2020 | Perrella et al. |
| 2020/0150655 A1 | 5/2020 | Artes et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1 | 12/2020 | Swaminathan |
| 2021/0019939 A1 | 1/2021 | Hu et al. |
| 2021/0146552 A1 | 5/2021 | Hong et al. |
| 2021/0163068 A1 | 6/2021 | Zhu et al. |
| 2021/0233305 A1 | 7/2021 | Garcia et al. |
| 2021/0271238 A1 | 9/2021 | Ko et al. |

FOREIGN PATENT DOCUMENTS

| | | |
|---|---|---|
| CN | 101809601 | 8/2008 |
| CN | 102214343 | 10/2011 |
| CN | 104200086 | 12/2014 |
| CN | 105701519 | 12/2015 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014063157 | 4/2014 |
| WO | WO 2014066422 | 5/2014 |
| WO | WO 2014092552 | 6/2014 |
| WO | WO 2014181323 | 11/2014 |
| WO | WO 2015127246 | 8/2015 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2017201483 | 11/2017 |
| WO | WO 2018018007 | 1/2018 |
| WO | WO 2018026631 | 2/2018 |
| WO | WO 2018204308 | 11/2018 |
| WO | WO 2018204342 | 11/2018 |
| WO | WO 2019023249 | 1/2019 |

OTHER PUBLICATIONS

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Castorena et al., "Autocalibration of lidar and optical cameras via edge alignment", 2016 IEEE International Conference on Acoustics, Speech and Signal Processing (Mar. 20, 2016).

(56) References Cited

OTHER PUBLICATIONS

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Clark, "Casino to open world's first NFC-enabled supermarket", (Sep. 18, 2018), pp. 1-7.
Clark, "Jogtek launches passive NFC shelf-edge labels", (Sep. 19, 2018), pp. 1-6.
Cleveland Jonas et al.: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D Lidar point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Gruen et al., "Automatic Reconstruction and Visualization of a Complex Buddha Tower of Bayon, Cambodia" (Sep. 2001) [http:www.idb.arch.ethz.ch/files/konstanz_bayonpaper.pdf].
Hackel et al., "Contour Detection in unstructured 3D point clouds, "IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/CN2017/083143 dated Feb. 11, 2018.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion for International Patent Application No. PCT/US2019/057007 dated Jan. 14, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
International Search Report and Written Opinion for International Patent Application No. PCT/US2021/057388 dated Feb. 2, 2022.
International Search Report and Written Opinion for International Patent Application No. PCT/IB2021/060948 dated Feb. 4, 2022.
International Search Report and Written Opinion for International Patent Application No. PCT/US2022/037723 dated Jul. 20, 2022.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud.". International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Alshawabkeh et al., "Automatic Multi-Image Photo-Texturing of Complex 3D Scenes", CIPA 2005 XX International Symposium, (Sep. 26, 2005).
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.

(56) References Cited

OTHER PUBLICATIONS

"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 19, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks, "in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140]. Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017.
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al.: "Product placement detection based on image processing", 2014 22nd Signal Processing and Communication Applications Conference (SIU), IEEE, Apr. 23, 2014.
Varol Gul et al.: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (Cybcon), IEEE, (Jun. 21, 2017).

(56) References Cited

OTHER PUBLICATIONS

Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.

\* cited by examiner

METHOD AND APPARATUS FOR OBJECT STATUS DETECTION

CROSS-REFERENCE TO RELATED APPLICATIONS

This application claims the benefit of priority to U.S. Provisional Patent Application No. 62/492,695 entitled "Method and Apparatus For Object Status Detection," filed on May 1, 2017 by Fu et al., which is incorporated herein by reference in its entirety.

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
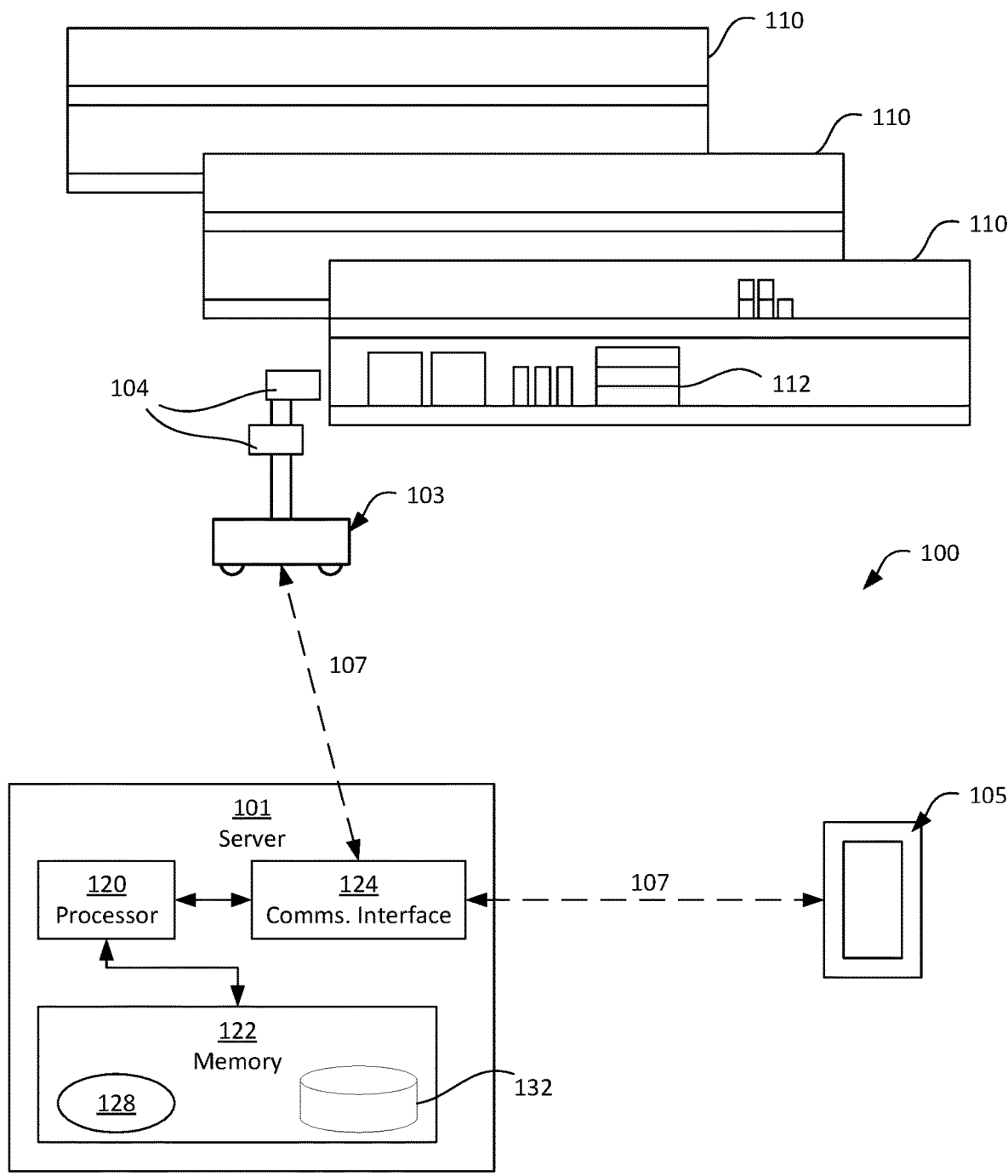
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on shelves, for selection and purchase by customers. As a result, the composition of the set of products supported by any given shelf module varies over time, as products are removed and, in some cases, replaced by customers. Products that have been partially or fully depleted typically require restocking, and products that have been incorrectly replaced (referred to as "plugs") typically require relocation to the correct position on the shelves. The detection of restocking or plug issues is conventionally performed by human employees, via visual assessment of the shelves and manual barcode scanning. This form of detection is labor-intensive and therefore costly, as well as error-prone.

Attempts to automate the detection of product status issues such as those mentioned above are complicated by the fluid nature of the environment in which an autonomous data capture system is required to operate. Among other difficulties, digital images of the shelves vary in quality depending on the available lighting, the presence of visual obstructions, and the like. Further, the breadth of products present on the shelves and the variations in their positioning on the shelves reduces the accuracy of machine-generated status detection.

Examples disclosed herein are directed to a method of object status detection for objects supported by a shelf, from shelf image data, including: obtaining a plurality of images of a shelf, each image including an indication of a gap on the shelf between the objects; registering the images to a common frame of reference; identifying a subset of the gaps having overlapping locations in the common frame of reference; generating a consolidated gap indication from the subset; obtaining reference data including (i) identifiers for the objects and (ii) prescribed locations for the objects within the common frame of reference; based on a comparison of the consolidated gap indication with the reference data, selecting a target object identifier from the reference data; and generating and presenting a status notification for the target product identifier.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. The shelf modules 110 are typically arranged in a plurality of aisles, each of which includes a plurality of modules aligned end-to-end. More specifically, the apparatus 103 is deployed within the retail environment, and communicates with the server 101 (via the link 107) to navigate, either fully or partially autonomously, the length of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors), and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data, obtain the captured data via the communications interface 124 and store the captured data in a repository 132 in the memory 122. The server 101 is further configured to perform various post-processing operations on the captured data and to detect the status of the products 112 on the shelves 110. When certain status indicators are detected by the imaging processor 120, the server 101 is also configured to transmit status notifications (e.g. notifications indicating that products are out-of-stock, low stock or misplaced) to the mobile device 105. The processor 120 is interconnected with a non-transitory computer readable storage medium, such as a memory 122, having stored thereon computer readable instructions for detecting out of stock and/or low stock inventory on the shelves 110, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In one embodiment, to increase reliability and processing speed of high volume of sensor data collected by the mobile automation apparatus 103, a specially designed integrated circuit, such as a Field Programmable Gate Array (FPGA), is designed to detect out of stock and/or low stock inventory discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the processor 120.

In the present example, in particular, the server 101 is configured via the execution of the control application 128 by the processor 120, to process input data including image and depth data captured by the apparatus 103, as well as attributes (e.g. of gaps between products 112 on the shelves 110, and identifiers of the products 112) derived from the image and depth data, to generate status notifications relating to the products 112.

Figure 2:
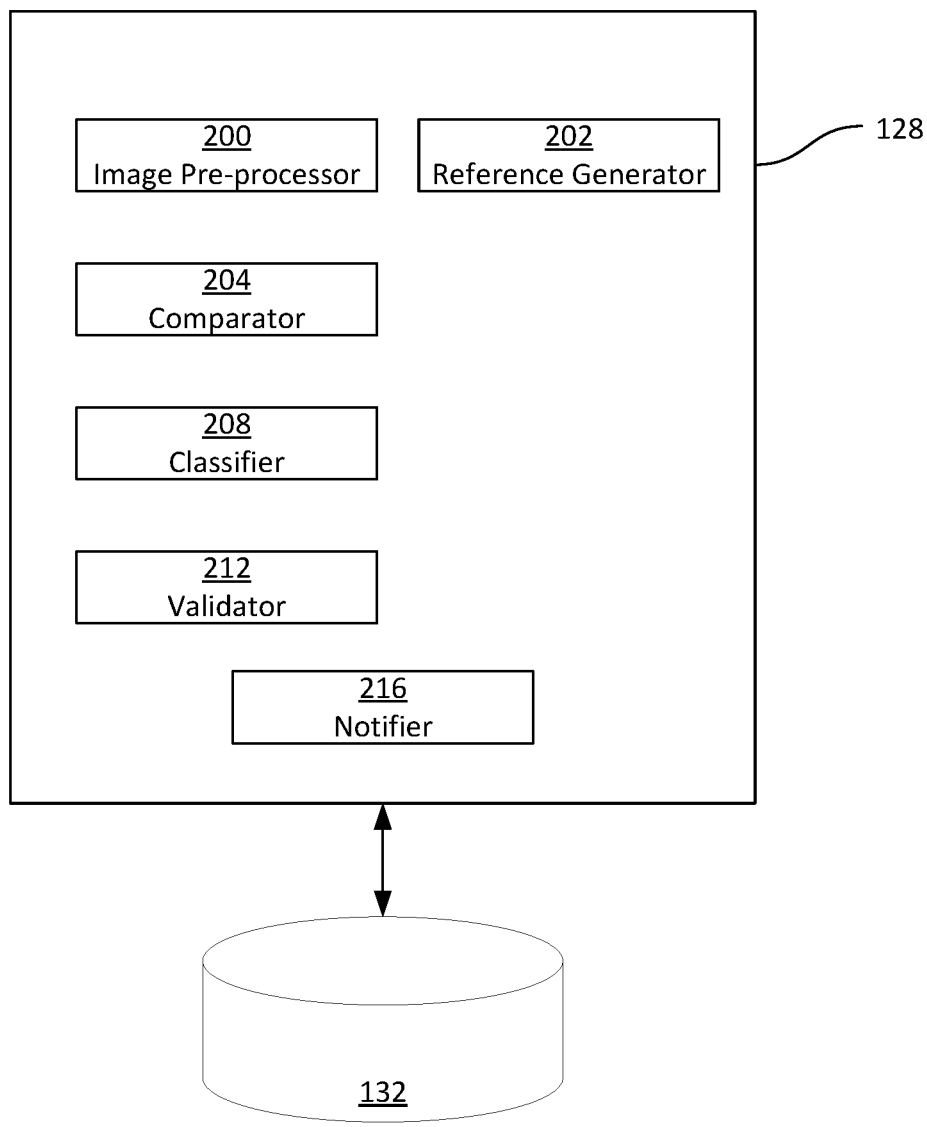
FIG. 2 is a block diagram of certain internal hardware components of the server in the system of FIG. 1.

Turning now to FIG. 2, before describing the operation of the application 128 to detect out of stock, low stock and/or plug inventory, certain components of the application 128 will be described in greater detail. As will be apparent to those skilled in the art, in other examples the components of the application 128 may be separated into distinct applications, or combined into other sets of components. Some or all of the components illustrated in FIG. 2 may also be implemented as dedicated hardware components, such as one or more Application-Specific Integrated Circuits (ASICs) or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize high volume image processing for the detection of high volume sensor data being received from the mobile automation apparatus 103. In such an embodiment, some or all of the control application 128, discussed below, is embodied in FPGA or ASIC chip logic.

The control application 128, in brief, includes components configured to obtain input data depicting certain attributes of shelves 110, to process the input data for comparison with reference data, and to generate product status notifications (such as out of stock, low stock, and plug notifications) based on the comparison.

More specifically, in the present example, the control application 128 includes an image pre-processor 200 configured to obtain and process input data depicting a shelf 110 and products 112. The control application 128 also includes a reference generator 202 configured to generate reference data relating to the shelf 110, for use by a comparator 204, which is configured to compare the reference data and the input data to identify mismatches therebetween. The control application 128 also includes a classifier 208, configured to classify the output of the comparator 204 (that is, the mismatches mentioned above). Further, the control application 128 includes a validator configured to validate the output of the classifier 208, as well as a notifier 216 configured to generate status notifications based on the output of the classifier 208 and the validator 212.

Figure 3:
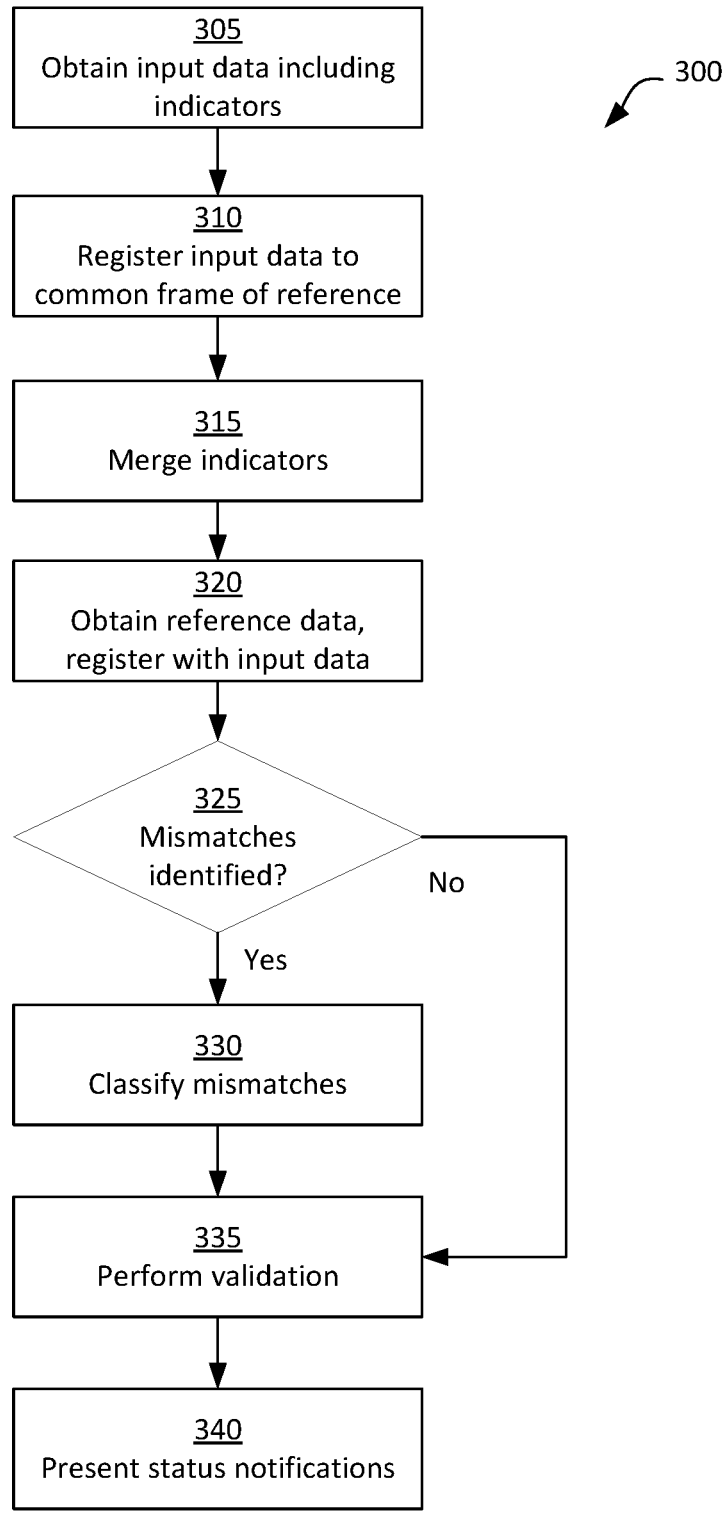
FIG. 3 is a flowchart of a method of object status detection.

The functionality of the control application 128 will now be described in greater detail, with reference to the components illustrated in FIG. 2. Turning to FIG. 3, a method 300 of object status detection is shown. The method 300 will be described in conjunction with its performance on the system 100 as described above.

Figure 4A:
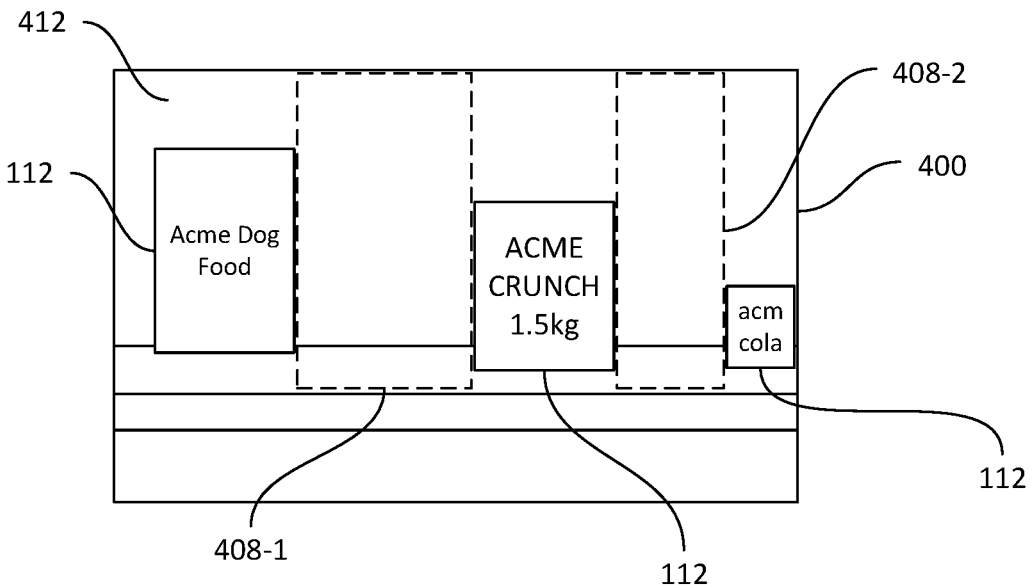
FIGS. 4A and 4B depict example input data to the method of FIG. 3.

The performance of the method 300 begins at block 305, at which the controller 120, and in particular the image pre-processor 200, is configured to obtain input data including at least one shelf image and at least one indicator of an attribute derived from the shelf image. The shelf image is, in the present example, a digital image (e.g. an RGB image) depicting a region of a shelf 110 and the products 112 supported by that region of shelf. In some examples, the above-mentioned indicators include gap indicators. Turning to FIG. 4A, an input image 400 is shown, including two gap indicators 408-1 and 408-2. Each gap indicator 408 defines a bounding box indicating, relative to the image 400, the location of a gap between products 112, where a back 412 of the shelf 110 is visible. In the present example, as shown in FIG. 4A, the gap indicators 408 are obtained at block 305 as an overlay on the image 400. In other examples, the gap indicators are obtained instead as metadata fields included with the image 400, or as a distinct set of values (e.g. bounding box coordinates) along with the image 400. In other examples, the above-mentioned gap indicators are obtained as a binary gap mask, indicating areas of the image 400 that have been classified as gaps (e.g. with a high intensity) and areas of the image 400 that have not been classified as gaps (e.g. with a low intensity).

Figure 4B:
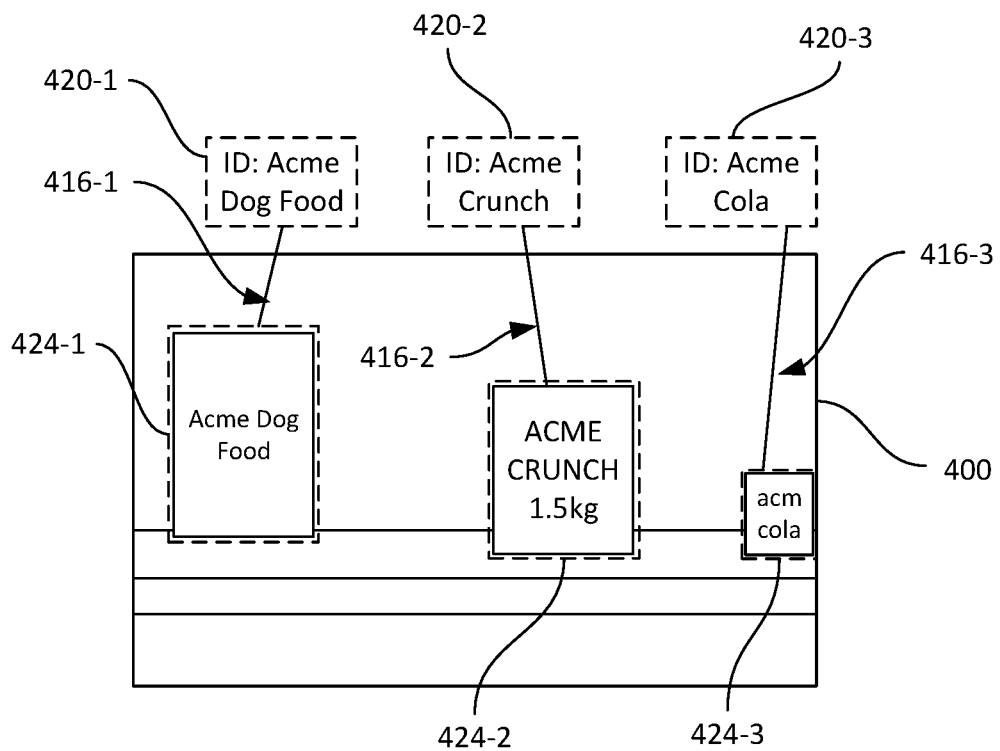

In other examples, referring to FIG. 4B, the indicators include object indicators 416 (of which three examples 416-1, 416-2 and 416-3 are illustrated). Each object indicator 416 includes an object identifier 420, such as a SKU number, text string or the like corresponding to a product 112. In the example illustrated in FIG. 4B, the object identifiers 420-1, 420-2 and 420-3 are text strings identifying respective products 112. Each object indicator 416 also includes an object location 424 within the image 400. In the illustrated example, the object locations 424-1, 424-2 and 424-3 are obtained at block 305 as bounding boxes overlaid on the image 400. In other examples, the object locations 424 and the object identifiers 420 are contained in metadata fields of the image 400, or are received as distinct data (e.g. a separate file) associated with the image 400. More specifically, the control application 128 includes a product recognition engine configured to compare various image features of the image 400 to a database of product models and to select product models having image features that match those in the image 400. For each selected product model, the product recognition engine is configured to insert into the image 400 or otherwise associate with the image 400 an indicator 416 including a location of the matching image features, as well as an object identifier 424 corresponding to those features.

At block 305, the image pre-processor 200 is also configured to obtain depth measurements corresponding to the image 400. The depth measurements and the images obtained at block 305 are typically captured substantially simultaneously by the apparatus 103 and stored in the repository 132. Therefore, at block 305 the image pre-processor 200 is configured to retrieve the image 400 and the depth measurements from the repository. The depth measurements are registered with the image 400 in the present example; that is, each depth measurement is assigned a location (e.g. pixel coordinates) within the image 400. In other examples, if the above registration has not yet been completed, the image pre-processor 200 is configured to register the depth measurements to the image 400.

Further, the image pre-processor 200 is configured, in the present example, to segment the above-mentioned depth measurements based on the indicators shown in FIG. 4. That is, the image pre-processor 200 is configured to project the bounding boxes defined by the indicators 408 or 416 onto the depth measurements, and to thereby assign a subset of the depth measurements to each bounding box. As will now be apparent, such segmentation assembles groups of depth measurements that correspond to individual gaps (for the indicators 408) and machine-recognized products 112 (for the indicators 416).

Figure 5:
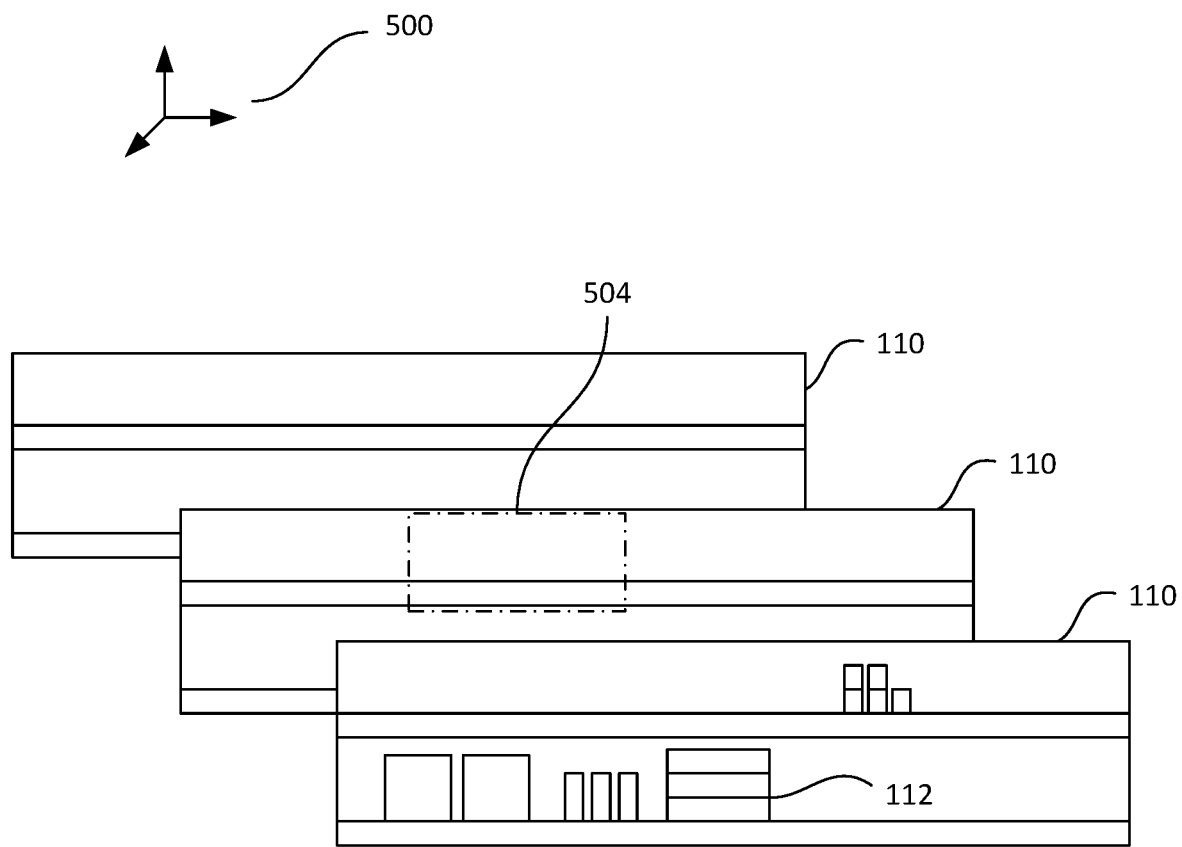
FIG. 5 depicts the location of the input data of FIG. 4 in a common frame of reference.

Returning to FIG. 3, at block 310, the image pre-processor 200 is configured to register the input data to a common frame of reference. The common frame of reference is a previously defined coordinate system for the retail (or other) environment containing the shelves 110. Turning to FIG. 5, an origin 500 is depicted, defining a coordinate system; thus, each shelf 110 as well as any other objects within the retail environment can be assigned coordinates relative to the origin 500. At block 310, the image pre-processor 200 is therefore configured to identify a region of the shelves 110 depicted by the image 400 obtained at block 305. The identification of such a region is based, in the present example, on navigation data generated by the apparatus at the time that the image 400 and depth measurements were captured, and stored in the repository 132. For example, in the present performance of block 310, the image pre-processor 200 identifies that the image 400 and corresponding depth measurements depict a region 504 of the shelves 110.

Figure 6:
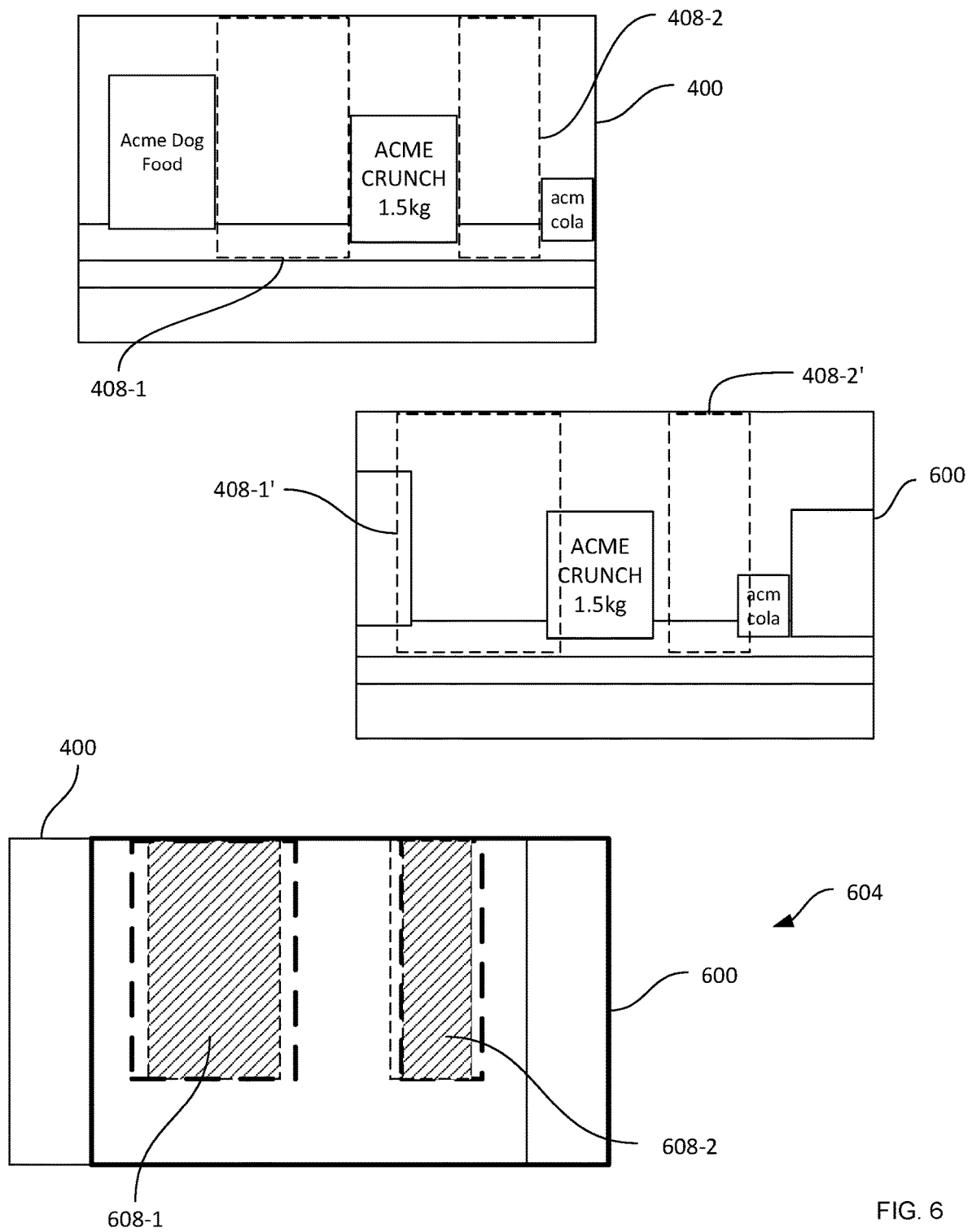
FIG. 6 illustrates location-based merging of input data.

At block 315, the image pre-processor 200 is configured to merge indicators that overlap in the common frame of reference. More specifically, the input data obtained at block 305 includes a plurality of images depicting overlapping portions of a shelf 110, in some examples. The apparatus 103 typically captures a stream of images while traveling along the shelves 110, and therefore each region of each shelf 110 is typically depicted in more than one capture image. At block 305, therefore, the image pre-processor 200 obtains a set of adjacent images (i.e. a set of images captured in sequence by the apparatus 103). FIG. 6 depicts the image 400, as well as a second image 600 depicting a region of the shelf 110 that overlaps with the region depicted by the image 400.

At block 315, the image pre-processor 200 is configured to register the images 400 and 600 with each other (i.e. to a common set of pixel coordinates), for example by applying a suitable image feature registration operation (e.g. edge and blob identification and matching) to the images 400 and 600. A registered image 604 resulting from the registration of the images 400 and 600 is also shown in FIG. 6, with the products 112 and the shelf omitted for simplicity. Having registered the images 400 and 600, the image pre-processor 200 is configured to identify subsets of the indicators (that is, subsets among the gap indicators 408-1, 408-2, 408-1' and 408-2', in the example of FIG. 6) that have overlapping locations in the registered image 604. As seen in FIG. 6, the gap indicators from the image 600 are overlaid, with heavier line weights, with the gap indicators from the image 400.

The gap indicators 408 and 408', while overlapping, do not overlap perfectly, for example due to the different physical positions of the apparatus 103 during the capture of the images 400 and 600, and due to imaging artifacts (e.g. lighting or contrast changes) in the images 400 and 600 that affect the detection of gaps by the control application 128. The image pre-processor 200 is configured, for each subset of overlapping indicators (i.e. two subsets in the illustrated example, indicators 408-1 and 408-1', and indicators 408-2 and 408-2'), to select one of the overlapping indicators for further processing via the method 300. For example, the input data can include a confidence level associated with each indicator 408, determined during the generation of the input data (i.e. of the gap indicators or the object indicators). In such examples, the image pre-processor 200 is configured to select the one indicator 408 from each subset with the highest confidence value. In other examples, the image pre-processor 200 is configured to generate a consolidated indicator, consisting of the overlapping area within each subset. Two such consolidated indicators 608-1 and 608-2 are shown in FIG. 6. In other examples, the performance of block 315 is omitted for the indicators 416 (i.e. the object indicators), or for the indicators 408 (i.e. the gap indicators), or both.

Figure 7A:
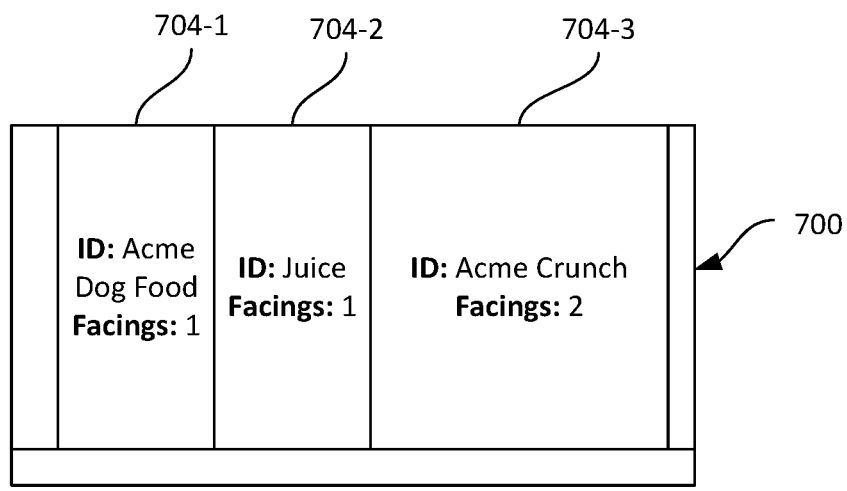
FIGS. 7A and 7B are examples of reference data for use in the method of FIG. 3.
Figure 7B:
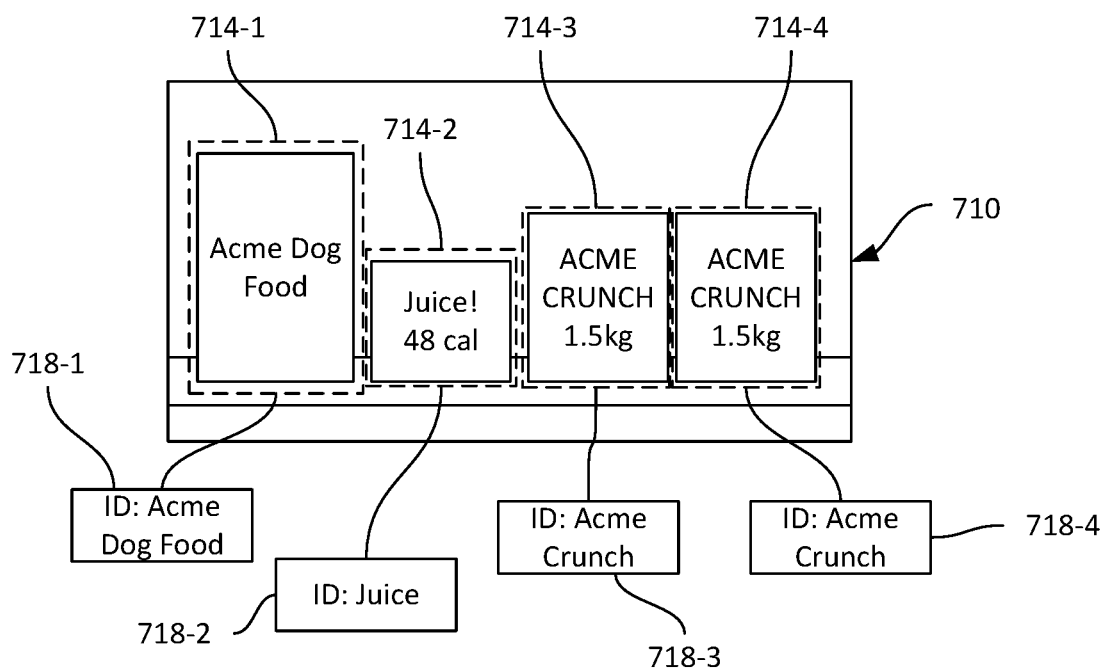

Referring again to FIG. 3, at block 320, the comparator 204 is configured to obtain, for example from the repository 132, reference data corresponding to the location depicted by the input data in the common frame of reference (that is the location 504, as shown in FIG. 5), and to register the reference data with the input data obtained at block 305. Turning to FIGS. 7A and 7B, two examples of reference data are shown. FIG. 7A, in particular, illustrates a portion of a reference planogram 700, containing reference indicators 704-1, 704-2 and 704-3. Each indicator 704 defines a reference location, for example via a bounding box within the common frame of reference. Each indicator 704 also includes a product identifier, such as a text string (as shown in FIG. 7A), a SKU number or the like. In addition, the indicators 704 can each include a facing number indicating the number of adjacent products having the same identifier that are expected to be within the corresponding bounding box. Thus, the indicator 704-3 indicates that within the specified bounding box, two adjacent boxes of "Acme Crunch" are expected to be present on the shelf 110.

FIG. 7B depicts another example form of reference data obtained at block 320. In particular, FIG. 7B depicts reference data 710 comprising a shelf image (e.g. an RGB image) including a plurality of reference object indicators. Each reference object indicator includes a reference location 714-1, 714-2, 714-3, 714-4 (illustrated as bounding boxes in the present example), and an associated reference product identifier 718-1, 718-2, 718-3, 718-4. The reference data 710, which may also be referred to as a realogram, is retrieved from the repository 132. In addition, the reference data 710 includes depth measurements segmented to each of the bounding boxes 714 as described above in connection with the performance of block 305.

Prior to its retrieval, the reference data 710 may be generated or updated by the reference generator 202. In particular, the reference generator 202 is configured to perform blocks 305, 310 and in some examples 315) of the method 300 in isolation, under "full stock" conditions in the retail environment. That is, the apparatus 103 can be configured to traverse the shelves 110 and capture image data and depth measurements, when the retail environment is fully stocked with the products 112. The capture of input data for use in reference data generation is performed a predetermined time intervals. For example, reference data capture may be performed once per day before the retail environment is open to customers. Other suitable time periods can also be used for reference data capture.

The reference generator 202, having obtained input image and depth data, is configured to obtain the reference object indicators as shown in FIGS. 7A and 7B by providing the input data to the above-mentioned product recognition engine. As will now be apparent, the reference generator 202 receives from the product recognition engine the reference locations 714 and the reference object identifiers 718. The reference generator 202 is then configured to store the image, as well as the reference object indicators, in the repository 132 in association with a location within the common frame of reference.

Figure 8:
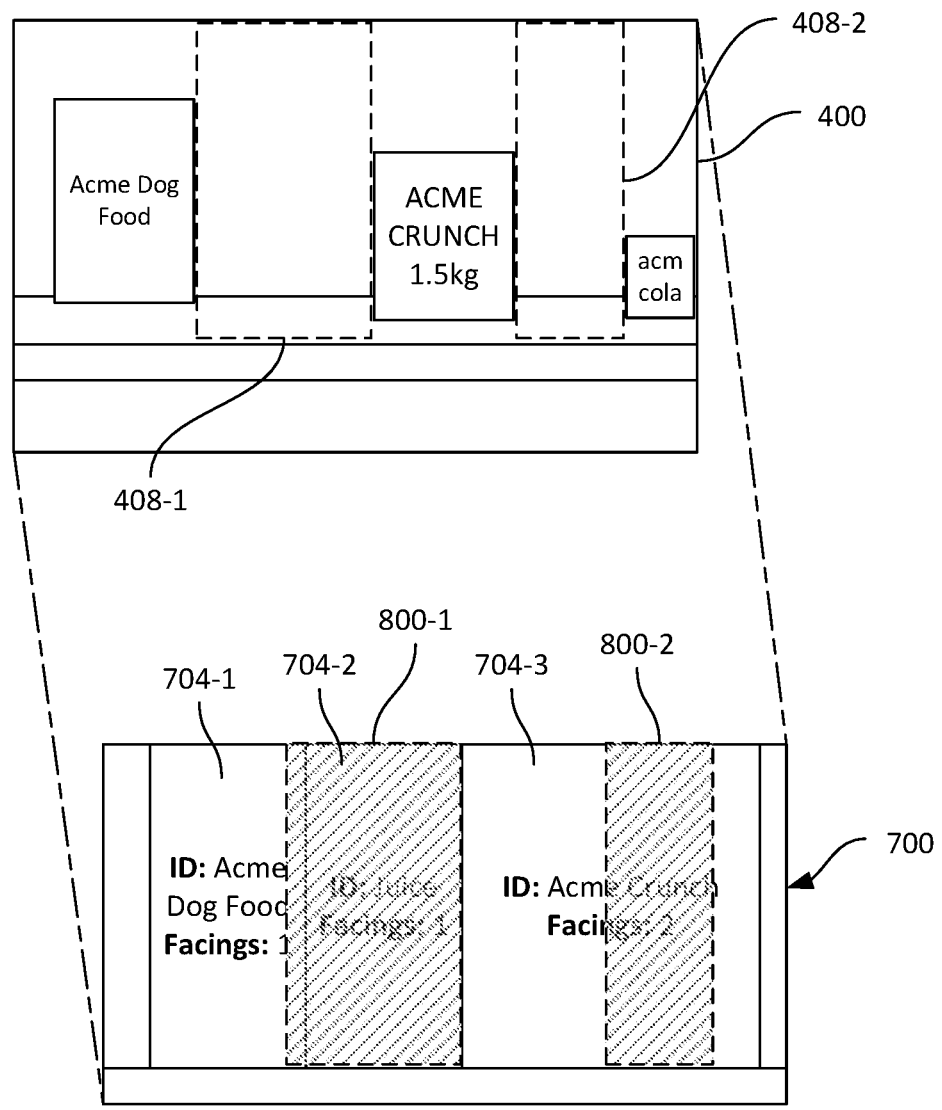
FIG. 8 illustrates the comparison of the input data of FIG. 4A with the reference data of FIG. 7A.

At block 325, responsive to obtaining the reference data, the comparator 204 is configured to determine whether any mismatches exist between the reference data retrieved at block 320 and the input data obtained and processed at blocks 305-315. In some examples, in which the input data includes the gap indicators 408, the comparator 204 is configured to retrieve the planogram 700 as reference data, and to determine whether the gap indicators 408 overlap with any of the reference indicators 704. When the determination is negative (i.e. no gap indicators overlap with any of the reference indicators 704), the performance of the method 300 advances to block 335, which is discussed below. However, in the present example performance, as seen in FIG. 8, the registration of the input data with the planogram 700 reveals that the gap indicators 408—shown as projections 800-1 and 800-2 over the planogram 700—overlap with all three of the reference indicators 704.

Figure 9:
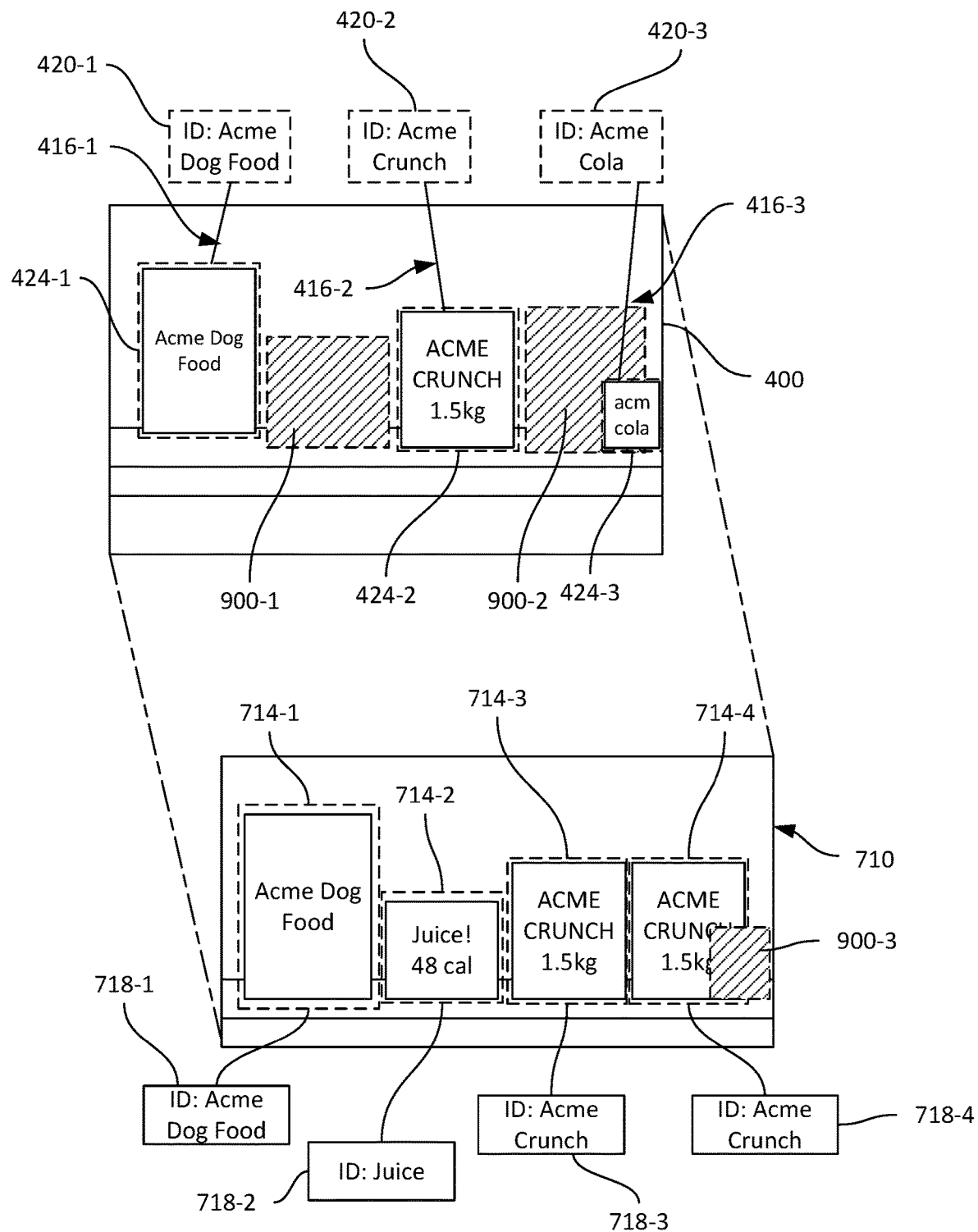
FIG. 9 illustrates the comparison of the input data of FIG. 4$b$ with the reference data of FIG. 7B.

FIG. 9 illustrates the registration of the input data including the object indicators 416 with the realogram 710. When the input data includes the object indicators 416, the comparator 204 is configured to retrieve the realogram 710 and determine whether any of the reference object indicators 714 and 718 are not represented in the input data, as well as whether any of the object indicators 416 are not represented in the reference data 710. As seen in FIG. 9, two reference indicators are not represented in the input data, as shown by the shaded areas 900-1 and 900-2 corresponding to the reference indicators for the product "Juice" and the product "Acme Crunch" respectively. Further, one object indicator included in the input data is not represented in the reference data 710, as shown by the shaded area 900-3 corresponding to the object indicator 416-3 for the product "Acme Cola".

Returning to FIG. 3, following an affirmative determination at block 325, the comparator 204 is configured to provide the mismatched object identifiers, also referred to as target object identifiers, to the classifier 208. At block 330, the classifier 208 is configured to assign, to each target object identifier, one of a plurality of preconfigured status types. In the present example, the status types include an out of stock (OOS) status, a low stock (LS) status, and a plug (PL) status. As will be apparent to those skilled in the art, an OOS status indicates that the corresponding product is depleted from the shelf 110 and requires replenishment. An LS status indicates that the corresponding product, although not entirely depleted, is nearing depletion. A PL status indicates that the corresponding product has been misplaced on the shelf 110—that is, the corresponding product, according to the reference data, was not expected in the location at which it has been detected.

When a mismatch indicates that an object identifier in the input data is not represented in the reference data, as shown in FIG. 9 in connection with the "Acme Cola" product, the classifier 208 is configured to assign a PL status type to the object identifier. When the mismatch indicates the reverse scenario, however—that is, an object identifier in the reference data that is not represented in the input data—the classifier 208 is configured to perform the classification process shown in FIG. 10 to select one of the OOS and LS status for the relevant object identifier.

Figure 10:
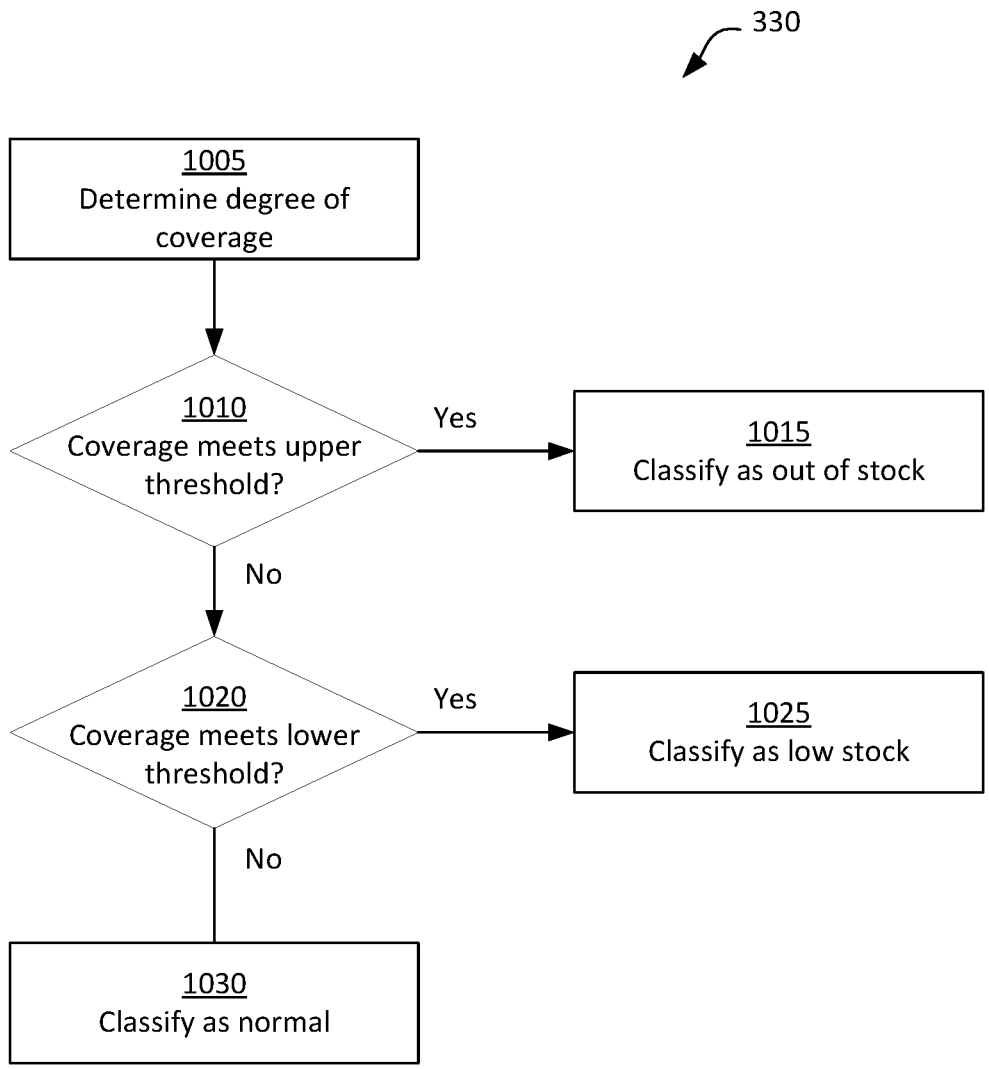
FIG. 10 is a flowchart of a method of status classification.

Referring to FIG. 10, at block 1005 the classifier 208 is configured to determine the degree of coverage of the mismatch identified at block 325. In the case of mismatches revealed by the gap indicators 408, at block 1005 the classifier 208 is configured to determine a proportion of at least one reference object indicator that overlaps with the gap indicator 408. Referring again to FIG. 8, for example, as shown by the shaded area 800-1, the gap indicator 408-1 overlaps entirely with the reference indicator 704-2 (i.e. overlaps 100% of the area defined by the reference indicator 704-2), and also overlaps with about 12% of the area of the reference indicator 704-1. Turning to FIG. 9, the shaded areas 900-1 and 900-2 indicate that the entirety of the reference location indicators 714-2 and 714-4 are not represented in the input data (i.e. the degree of coverage of the mismatches detected in association with the reference indicators 714-2 and 714-4 is 100%).

In some examples, the classifier 208 is configured to determine the degree of coverage as a number of facings expected from the reference data but not represented in the input data, rather than a percentage as discussed above. To determine a number of missing facings when the input data includes the gap indicators 408, the classifier 208 is configured to determine a facing width for the relevant product from the reference data. In the present example, referring to FIG. 7, each reference indicator 704 in the planogram 700 defines a total width of the region expected to contain a given product, as well as a number of facings of that product. The facing width is therefore determined by dividing the total indicator width by the facing number from the planogram. In other examples, the planogram may also contain data defining the width of each facing (i.e. the width of the product). Returning to FIG. 10, therefore, the classifier 208 is configured to determine a facing width for the mismatched object indicator, and to determine how many facing widths are covered by a given gap indicator 408. As shown in FIG. 8, the degree of coverage represented by the shaded area 800-1 corresponds to one facing of the "Juice" product, and to about 12% of one facing of the "Acme Dog Food" product. The shaded area 800-2, meanwhile, covers about 70% of one facing for the "Acme Crunch" product.

The classifier 208 is configured to adjust facing numbers covered by mismatches, for example based on preconfigured thresholds. For example, if the degree of coverage determined at block 1005 is greater than 65%, the classifier 208 is configured to adjust the degree of coverage to one facing. Conversely, if the degree of coverage is less than 50%, the classifier 208 is configured to set the degree of coverage to zero facings (as such low coverage may be a result of expected spaces between products 112, rather than spaces indicating missing products).

When the input data includes the object indicators 416, the classifier 208 is configured to determine a degree of coverage in facings by counting the number of adjacent reference indicators having the same product identifier that are not represented in the input data. As seen from FIG. 9, in the present example the degree of coverage of the shaded areas 900-1 and 900-2 are one facing each.

At block 1010, having determined a degree of coverage of the mismatches identified at block 325, the classifier 208 is configured to determine whether each degree of coverage meets or exceeds an upper threshold. The upper threshold can be set as a percentage (e.g. 90% of the area of a planogram indicator 704), or as a number of facings. Typically, the upper threshold corresponds to all expected facings of the mismatched product. Thus, the upper threshold for the reference indicator 704-2 is one facing, and the determination at block 1010 for the shaded area 800-1 is affirmative. However, the upper threshold for the reference indicator 704-3 is two, and the determination at block 1010 for the shaded area 800-2 is therefore negative.

When the determination at block 1010 is affirmative, the classifier 208 assigns an OOS status to the relevant reference object identifier at block 1015. When the determination at block 1010 is negative, however, the classifier 208 proceeds to block 1020 to determine whether the degree of coverage meets or exceeds a lower threshold. The classifier 208 can determine the lower threshold based on the expected number of facings of a product, as specified by the reference data 700 or 710. More specifically, the lower threshold is set as the total number of expected facings, minus a minimum number of required facings to avoid the generation of a low stock status notification. Typically, low stock notifications are generated when only one facing remains of a product with a number of expected facings greater than one. Therefore, the lower threshold is typically one facing lower than the total expected number of facings. Thus, if the degree of coverage meets the lower threshold, only one facing of the product remains, and the classifier 208 is configured to assign an LS status to the relevant reference object identifier at block 1025. Referring again to FIG. 8, the LS status is assigned to the mismatch indicated by the shaded area 800-2 (i.e. to the product "Acme Crunch"). When the determination at block 1020 is negative, however, the classifier 208 is configured to assign a "normal" status to the mismatch, indicating that although a product is not fully stocked on the shelf 110, it has not been sufficiently depleted to warrant a low stock notification.

Following the classification process, performance of the method proceeds to block 335. At block 335, the validator 212 is configured to validate the output of the classifier 208, for example based on the depth measurements obtained at block 305. The validation at block 335 includes any one of, or any combination of, several distinct validations. For example, the validator 212 can be configured to obtain a shelf edge location relative to the input data, and to retrieve a known shelf depth (i.e. the distance between the shelf back 412 and the shelf edge). The shelf edge location can be detected from the depth measurements, or can be retrieved from the repository 132. Having obtained the shelf edge location and shelf depth, the validator 212 is configured to determine whether the depth measurements for areas corresponding to any products assigned an OOS status at block 330 are sufficiently beyond the shelf edge to confirm the OOS status. That is, the validator 212 is configured to determine whether the depth measurements corresponding to the shaded area 800-1 are greater than the shelf edge depth by a margin substantially equal to the known shelf depth. If the determination is negative, the corresponding gap indicator 408 may have been incorrect (i.e. a product may be present on the shelf 110 that was detected as a gap). When the determination is negative, the validator 212 is configured to alter the status classification from OOS to PL.

In other examples, the validator 212 is configured, for a reference object identifier assigned the PL status, to retrieve a segment of depth measurements from the repository 132 corresponding to the relevant reference object identifier. The depth measurements are retrieved from a location in the common frame of reference different than that depicted by the input data, as the product assigned a plug status has been misplaced. Responsive to retrieving the segment of depth measurements, which represent a three-dimensional scan of the plug product, the validator 212 is configured to compare the retrieved reference depth measurements with the segmented depth measurements corresponding to the plug (e.g. the depth measurements corresponding to the shaded area 900-3 in FIG. 9). When the reference depth measurements match the input depth measurements, the plug status is confirmed. Otherwise, the validator 212 is configured to discard the plug status assignment, or alter the assignment to indicate a reduced confidence level, for example.

In further examples, the validator 212 is configured to obtain a shelf edge location as discussed above, and to determine whether the depth measurements segmented with any of the object indicators 416 exceed the depth of the shelf edge location by a configurable threshold. If the threshold is exceeded, the corresponding product is placed towards the shelf back 412, away from the shelf edge. For example, referring to FIG. 9, the object indicator 416 indicates that the product "Acme Dog Food" is present, as expected by the reference realogram 710. However, comparison of the depth measurements corresponding to the object location 424-1 to the shelf edge reveals that the object location 424-1 is further from the shelf edge than a predetermined threshold (e.g. three centimeters). The validator 212 is therefore configured to generate an additional low-stock status assignment, beyond those generated at block 330.

Following completion of the validation at block 335, at block 340 the notifier is configured to generate one or more status notifications based on the outputs of the classifier 208 and the validator 212. Each status notification includes a product identifier, the status assigned to the product identifier, and the location of the corresponding indicator in the common frame of reference. Table 1 contains a list of status notifications generated based on the examples of input data and reference data discussed above.

TABLE 1

| Status Notifications | | |
|---|---|---|
| Product ID | Status | Location |
| Acme Crunch | LS | [X, Y, Z] |
| Acme Dog Food | LS | [X, Y, Z] |
| Juice | OOS | [X, Y, Z] |
| Acme Cola | PL | [X, Y, Z] |

As seen in Table 1, the first, third and fourth rows represent status notifications generated based on classification assigned at block 330, while the second row represents a status notification generated by the validator 212 at block 335. The status notifications are stored in the repository 132, in some examples. In other examples, the status notifications are transmitted directly to a client computing device, such as the mobile device 105.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method by an imaging controller of object status detection for objects supported by a shelf, from shelf image data, the method comprising:
   obtaining, at an image pre-processor of the imaging controller a plurality of images of a shelf, each image including an indication of a gap on the shelf between the objects;
   registering, by the image pre-processor, the images to a common frame of reference;
   identifying, by the image pre-processor, a subset of the gaps having overlapping locations in the common frame of reference;
   generating, by the image pre-processor, an indication from the subset of a consolidated gap between the objects;
   obtaining, by a comparator of the imaging controller, reference data including (i) identifiers for the objects and (ii) prescribed locations for the objects within the common frame of reference;
   based on a comparison of the consolidated gap indication with the reference data, selecting, by the comparator, a target object identifier from the reference data; and
   generating and presenting, by a notifier of the imaging controller, a status notification for the target product identifier.

2. The method of claim 1, wherein the selecting comprises selecting a target object identifier having a prescribed location that overlaps the location of the consolidated gap indication.

3. The method of claim 2, further comprising determining a degree of coverage of the prescribed location of the target object identifier by the consolidated gap indication.

4. The method of claim 3, further comprising:
   determining whether the degree of coverage exceeds an upper threshold; and
   wherein when the degree of coverage exceeds the upper threshold, generating the status notification comprises generating an out-of-stock notification.

5. The method of claim 4, further comprising:
   when the degree of coverage does not exceed the upper threshold, determining whether the degree of coverage exceeds a lower threshold; and
   wherein when the degree of coverage exceeds the lower threshold, generating the status notification comprises generating a low-stock notification.

6. The method of claim 3, wherein determining the degree of coverage comprises:
   retrieving dimensions and a facing number corresponding to the target object identifier, and determining a width of the prescribed location based on the dimensions and the facing number; and
   determining a proportion of the width covered by a width of the consolidated gap indication.

7. The method of claim 1, wherein the plurality of images each comprise a binary gap mask generated from an image of the shelf captured by a mobile automation apparatus.

8. The method of claim 1, further comprising:
   obtaining depth measurements corresponding to the images;
   registering the depth measurements to the common frame of reference; and
   validating the consolidated gap indication based on the depth measurements.

9. The method of claim 8, further comprising:
   determining, based on the validation, that the consolidated gap indication is incorrect; and
   responsive to the determining, generating the status notification as a plug notification.

* * * * *